(12) United States Patent
Herve et al.

(10) Patent No.: US 7,652,764 B2
(45) Date of Patent: Jan. 26, 2010

(54) METHOD FOR RECONSTRUCTING A FLUORESCENCE-ENHANCED OPTIC TOMOGRAPHY IMAGE OF AN OBJECT WITH ANY OUTLINE

(75) Inventors: Lionel Herve, Villeurbanne (FR); Jean-Marc Dinten, Lyons (FR); Anne Koenig, Saint Martin d'uriage (FR)

(73) Assignee: Commissariat a l'Energie Atomique, Paris (FR)

( * ) Notice: Subject to any disclaimer, the term of this patent is extended or adjusted under 35 U.S.C. 154(b) by 300 days.

(21) Appl. No.: 11/797,602

(22) Filed: May 4, 2007

(65) Prior Publication Data

US 2007/0239036 A1 Oct. 11, 2007

Related U.S. Application Data

(63) Continuation-in-part of application No. PCT/FR2007/000422, filed on Mar. 9, 2007.

(30) Foreign Application Priority Data

Mar. 10, 2006 (FR) .................................. 06 02136

(51) Int. Cl.
*G01N 21/64* (2006.01)
*G06T 11/00* (2006.01)
(52) U.S. Cl. ........................ 356/317; 600/425
(58) Field of Classification Search ................ None
See application file for complete search history.

(56) References Cited

U.S. PATENT DOCUMENTS 5,762,607 A 6/1998 Schotland et al.

FOREIGN PATENT DOCUMENTS

WO WO 2004/072906 A1 8/2004

OTHER PUBLICATIONS

Arridge S.R., "Optical Tomography in Medical Imaging," 1999, Inverse Problems, vol. 15, pp. R41-R93.
Joshi A. et al., "Adaptive Finite Element Based Tomography for Fluorescence Optical Imaging in Tissue," Nov. 2004, Optics Express, vol. 12, No. 22, pp. 5402-5416.
Schulz R. et al., "Experimental Fluorescence Tomography of Tissues with Noncontact Measurements," Apr. 2004, IEEE Transactions on Medical Imaging, vol. 23, No. 4, pp. 492-500.
Scherleitner E. et al., "Optical Tomography Imaging Based on Higher Order Born Approximation of Diffuse Photon Density Waves," Aug. 2005, IEEE Transactions on Instrumentation and Measurement, vol. 54, No. 4, pp. 1607- 1611.

(Continued)

*Primary Examiner*—F. L Evans
(74) *Attorney, Agent, or Firm*—Oliff & Berridge, PLC (57) ABSTRACT

The method enables a heterogeneous object containing fluorophores to be examined. A first face of the object is illuminated with an excitation light exciting the fluorophores. The light emitted by a second face of the object, opposite the first face, is detected by means of a matrix of detectors. The fluorophore distribution is determined by means of relevant Green's functions each associated with a selected source and/or detector, able to be assimilated to a point of the surface of the object. Thus, a first spatial coordinate of each of the relevant Green's functions corresponds to a point of the first face of the object and/or a second spatial coordinate of each of the relevant Green's functions corresponds to a point of the second face of the object.

10 Claims, 5 Drawing Sheets

OTHER PUBLICATIONS

Ripoll J. et al., "Free-Space Propagation of Diffuse Light: Theory and Experiments," Sep. 2003, Physical Review Letters, vol. 91, No. 10, pp. 103901.1-103901.4.

Herve L. et al., "Non Contact Fluorescence Optical Tomography by Means of Numerical and Analytical Approaches," Feb. 2007, Nuclear Instruments and Methods in Physics Research, vol. 571, pp. 203-206.

Herve L. et al., "In Vivo Fluorescence Enhanced Optical Tomography Reconstruction of Lungs Cancer of Non Immersed Small Animals," Jan. 2007, Proceedings of SPIE, vol. 6434.

Schotland J. C., "Tomography with Diffusing Photons: A Feynman Path Integral Perspective," Jun. 2000, Acoustics, Speech and Signal Processing, 2000. vol. 6, pp. 3791-3794.

METHOD FOR RECONSTRUCTING A FLUORESCENCE-ENHANCED OPTIC TOMOGRAPHY IMAGE OF AN OBJECT WITH ANY OUTLINE

This application is a continuation in part of International Patent Application PCT/FR2007/000422 filed on Mar. 9, 2007.

BACKGROUND OF THE INVENTION

The invention relates to a method for reconstructing a fluorescence-enhanced optic tomography image to examine a heterogeneous object of any shape comprising fluorophores and disposed in air. Such a method comprises:
  illuminating a first face of the object with a fluorophore excitation light, and
  detecting a light emitted by a second face of the object, opposite the first face, by means of a matrix of detectors,
the fluorophore distribution being determined by means of Green's functions each associated with a first and second spatial coordinate.

STATE OF THE ART

Fluorescence-enhanced optic tomography consists in determining the three-dimensional distribution of fluorophores in an object comprising a diffusing medium. The fluorophores can be functionalized to target tumoral cells and thereby to mark cancerous cells. A front face of the object is illuminated by an excitation light having a spectrum corresponding to the fluorophore. Generally an excitation light is moved point by point on the surface of the object and a camera records the image of the fluorescence light emitted by the rear face of the object, in the case of a transmission geometry where the object presents for example the shape of a slice or plate (slab type geometry). The front face and opposite rear face then form two parallel planes. This geometry is frequently used in mammography and small animal imaging.

Figure 1:
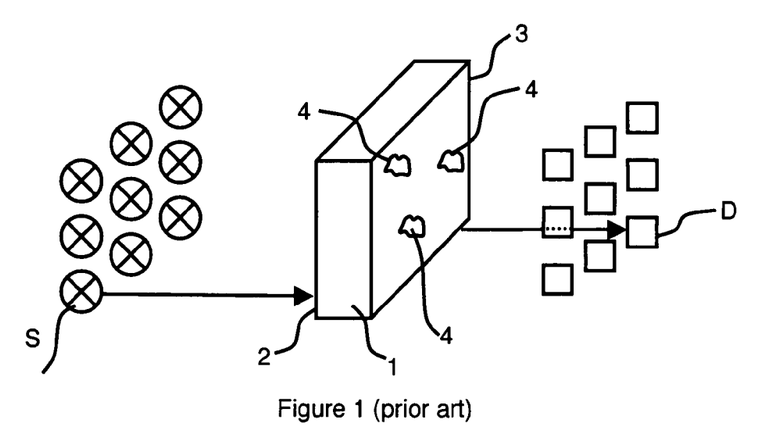
FIG. 1 illustrates a reconstruction method according to the prior art.

As represented in FIG. 1, the object 1 is illuminated by a set of light sources S having an excitation wavelength $\lambda$ex, placed facing a first face 2 of the object 1. The light transmitted at the excitation wavelength $\lambda$ex and the light emitted by the fluorophores 4 with an emission wavelength $\lambda$em (fluorescence wavelength) are detected by a set of detectors D arranged facing a second face 3 of the object 1, opposite the first face 2. In practice, the set of sources can be replaced by a laser whose beam moves on the first face 2 of the object 1.

The excitation wavelength $\lambda$ex and emission wavelength $\lambda$em are detected separately by means of optical filters. The excitation signals Uex(s,d), detected at the excitation wavelength $\lambda$ex can thereby be differentiated from the fluorescence signals Uem(s,d) detected at the emission wavelength $\lambda$em, and d being the indices respectively identifying the source S and detector D corresponding to the signal U(s,d), i.e. the source S and detector D activated for acquisition of the signal U(s,d).

Processing of the signals Uex(s,d) and Uem(s,d) enables the distribution of the fluorophores 4 in the object 1 to be reconstructed. The algorithms used to solve this problem are well known and described for example in the article "Optical tomography in medical imaging" by S. R. Arridge (Inverse Problems 15, R41-R93, 1999). The problem is in particular solved from an equation, conventionally called diffusion equation, established from a radiative transfer equation. Each source S generates in the medium a diffusive wave having the wavelength $\lambda$ex. The diffusive waves propagates in the medium and a part of the energy of the diffusive wave excites the fluorophores 4, which can be considered as secondary sources re-emitting a radiation at the emission wavelength $\lambda$em.

The diffusion equation is conventionally solved by means of Green's functions in a parallel plane geometry, enabling an analytical expression to be obtained for the propagation of the diffusive wave in the medium.

As far as the fluorescence signal is concerned, each fluorophore 4 is considered to present a photon conversion parameter corresponding to the fraction of the incident energy which is re-emitted at the emission wavelength $\lambda$em. In a more general manner, a conversion parameter X(m) can be associated with each volume element M (voxel) of the object 1, where m is the mesh index identifying the voxels M which are defined according to any mesh of the volume of the object 1. The Green's function corresponding to light propagation between a voxel M and a detector D is noted G(m,d). Moreover, the Green's function corresponding to light propagation between a source S and a voxel M is noted G(s,m). The incident flux in the voxel M, corresponding to the source S, is proportional to Q(s)G(s,m), where Q(s) is the flux emitted by the source S. The flux re-emitted by the voxel M at the emission wavelength $\lambda$em is given by Q(s)G(s,m)X(m). The contribution of the voxel M, excited by the source S, to the signal detected by the detector D is therefore proportional to Q(s)G(s,m)X(m)G(m,d). Considering the whole volume of the object, the signal Uem(s,d) is proportional to the sum of the contributions of all the voxels M, i.e. to the expression Q(s)$\Sigma$m(G(s,m)X(m)G(m,d)). When the fluxes Q(s) emitted by the sources S are constant and equal for the different sources, the different constants can be incorporated in the conversion parameters X(m) and the following is obtained:

$$U_{s,d}^{em} = \sum_m G_{s,m} X_m G_{m,d} \quad (1)$$

A linear equation system is thereby obtained linking the measurements provided by the detectors to the conversion parameters X(m), which are unknown and sought to be found.

Acquisition of a sufficient number of measurements thus enables the distribution of the fluorophores 4 in the object 1 to be reconstructed. Reconstruction proper is for example performed by means of an iterative ART (Algebraic Reconstruction Technique) algorithm, which minimizes the error between the experimental measurements and the computed analytical result.

The ART algorithm minimizes the error $$\left\| \frac{U_{s,d}^{em}}{U_{s,d}^{ex}} - \frac{\sum_m G_{s,m} X_m G_{m,d}}{U_{s,d}^{ex}} \right\|^2 = \|Y_{mes} - WX_m\|^2 \quad (2)$$

with W=G(s,m)G(m,d)/Uex(s,d).

The fluorescence excitation light and the fluorescence light are usually situated in the near-infrared spectral band, as the penetration capacity of this light is relatively high in biological tissues. The extinction coefficient being for example 2.5 cm$^{-1}$, the light intensity is reduced by a factor 12 for each centimeter penetrated, which in practice excludes any analysis at a depth of more than 10 cm.

In general manner, the positions of the detectors in space are taken into account. Typically, the sources and detectors are considered as being in contact with the object. When a laser is used for example, the point of impact of the laser on the object can be taken as the position of the light source. The detectors can be in contact with the object as in the case of an optic fiber coming into contact with the object.

When a source modulated at a given frequency is used, the phase shift of the wave can be measured. Finally, when an impulse source and time-resolved detection are used, the impulse response of the system can also be measured. In all cases, the corresponding signals can be described by means of the signals U(s,d) of the model introduced above.

Known image reconstruction methods correspond to simple particular cases in which the Green's functions can be expressed analytically. For example, an infinite object, a cylindrical geometry, a parallelepipedic geometry or a parallel planes geometry as above are considered. However, the case of a heterogeneous object of unknown shape is difficult to process.

A known technique consists in arranging the object in a recipient of simple shape filled with an index matching liquid presenting optical diffusion and absorption properties close to those of the object. This enables the object to be processed as an object of simple shape. However, the use of an index matching liquid requires additional steps, which it is sought to avoid.

For any geometry, the Green's functions can be determined by solving the diffusion equation by a numerical method, for example by the finite element method, as described in the article "Adaptive finite element based tomography for fluorescence optical imaging in tissue" by A. Joshi et al. (Optics Express 5402, Vol. 12, No. 22, 1 Nov. 2004). The finite boundary element method is described in the article "Experimental Fluorescence Tomography of Tissues With Noncontact Measurements" by R. B. Schulz et al. (IEEE Transactions on Medical Imaging, Vol. 23, No. 4, April 2004). These methods require a large number of computations and are therefore slower than analytical methods. In addition, the shape of the object has to be determined beforehand, for example by means of a laser triangulation system.

As biological media are heterogeneous, the Green's functions have to be adapted. For a simple geometry for example, the Green's functions and the optical parameters of the system are determined in iterative manner from the difference between the measured signal corresponding to the heterogeneous medium and the theoretical signal corresponding to a homogeneous medium. In this case, G(m,m'), the Green's function corresponding to light propagation between a voxel M and a voxel M' of the mesh, is also defined. In addition, the Green's function corresponding to light propagation between a source S and a detector D is noted G(s,d). However, computation of the matrix G(m,m') requires a very long computation time. Another similar technique is described in the article "Optical Tomography Imaging Based on Higher Order Born Approximation of Diffuse Photon Density Waves" by E. Scherleitner et al. (IEEE Transactions on Instrumentation and Measurement, Vol. 54, No. 4, August 2005).

The article "Free-Space Propagation of Diffusive Light: Theory and Experiments" by J. Ripoll et al. (Physical Review Letters, Vol. 91, No. 10, 2003) describes a technique for determining the distribution of the light intensity emitted by a homogeneous object of any shape, considering the diffusive light propagation in free space. This enables measurements to be used when the detectors are not in contact with the object, such as for example in the case of a CCD camera, which cannot be in perfect contact with a biological object of any shape. The light intensity at the surface of the object can thereby be determined from knowledge of the shape of the surface of the object.

OBJECT OF THE INVENTION

The object of the invention is to remedy the shortcomings of known methods. It has in particular the object of simplifying the fluorophore distribution reconstruction process in the case of a heterogeneous medium having any shape, in particular without requiring the use of an index matching liquid. A further object of the invention is to avoid the use of complex numerical methods.

According to the invention, this object is achieved by a method according to the accompanying claims.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 2:
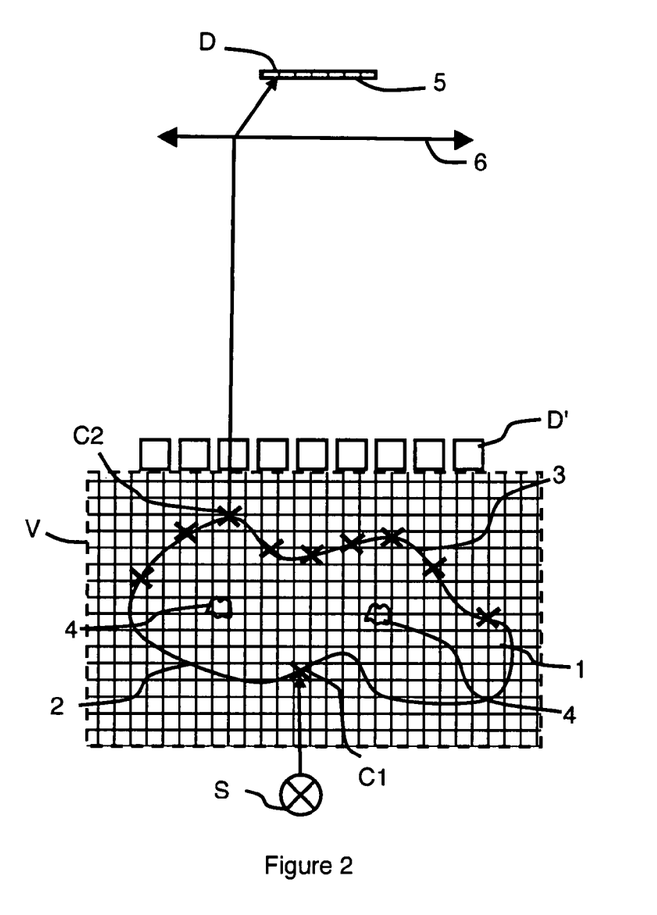
FIGS. 2 and 3 illustrate two alternative embodiments of the method according to the invention.

The heterogeneous object comprising fluorophores 4, represented in FIG. 2, has any shape and is not disposed in an index matching liquid but simply placed in air.

In a first step, the object 1 is first of all considered as being contained in a dummy volume V, of simple geometry, whose Green's functions are known by an analytical formula. Such a volume V can, as in FIG. 2, be formed by a parallelepiped. It can also be formed by a cylindrical volume or by a volume bounded by two parallel planes and which may be of infinite dimension.

This dummy volume is then conventionally divided into a plurality of voxels M with a suitable mesh. A light source S and a matrix of detectors D, for example a CCD camera 5, are then arranged on each side of the dummy volume V. A suitable optic 6 is arranged between the matrix of detectors D and the object 1 so as to form a clear image D' of the matrix of detectors in a plane situated in immediate proximity to the corresponding face of the dummy volume V. In practice, the image D' is preferably disposed at a distance from this top face corresponding to the pitch of the mesh dividing the volume V.

A first face 2 of the object 1 is thus disposed facing the light source S to illuminate the face 2 of the object 1 with an excitation light λex exciting the fluorophores 4. The matrix of detectors D, for example a CCD camera 5, detects the light (λem, λex) emitted by the second face 3 of the object 1 when point by point movement of the source S takes place, to scan the first face 2 of the object 1.

To enable subsequent reconstruction of the distribution of the fluorophores 4, the Green's functions said to be relevant, i.e. the Green's functions the use of which procures appropriate information, first have to be defined. Each Green's function G(C1, C2) is conventionally associated with a first spatial coordinate C1 and with a second spatial coordinate C2.

A Green's function G(s, m) is associated with each position of the source S and with each voxel M of the dummy volume V. In like manner, a Green's function G(m,d) is associated with each element of the matrix of detectors and with each voxel M of the dummy volume V, and Green's functions G(s, d) are associated with each source/detector pair.

Definition of the relevant Green's functions in the case of a heterogeneous object, of any shape, disposed in air and contained within the dummy volume V, is performed by selecting the appropriate sources and detector elements, called relevant sources and detectors.

Figure 5:
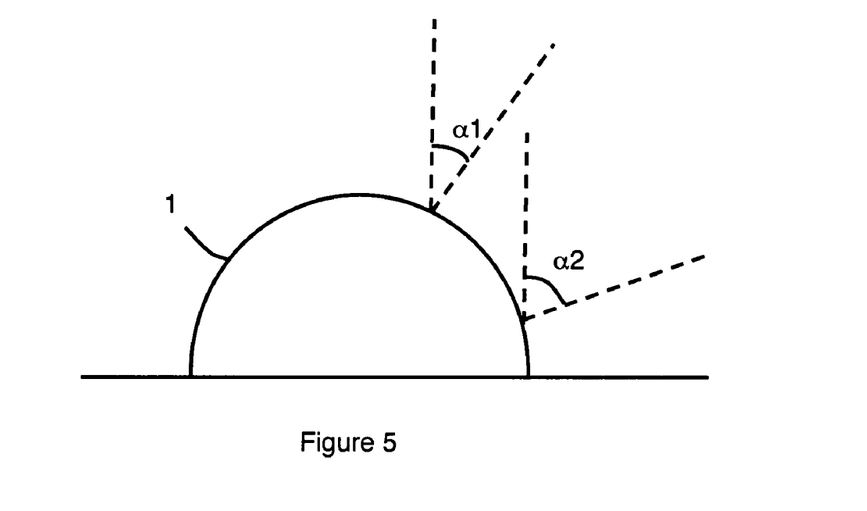
FIG. 5 on the one hand, and FIGS. 6 and 7 on the other hand, respectively illustrate two methods for determining the surface points to be taken into account for selecting the relevant sources and detectors according to the flowchart of FIG. 4.

In a first embodiment illustrated in FIGS. 2 and 5, at least a part of the shape of the surface of the object 1 is determined experimentally, for example by triangulation. Any detector D which is optically associated with a point of a known part of the second face 3 of the object 1 is considered to be relevant and selected to reconstruct the fluorescence-enhanced optical tomography image. Optical association of a point with the spatial coordinate C2 of the second face 3 of the object with a detector D is schematized in FIG. 2 by the optical path of a radiation emitted by this point. The relevant detector elements are thereby all virtually assimilated to points located on a known part of the second face 3 of the object.

Green's functions G(m,d) and/or G(s,d) representative of the light intensities emitted on the second face 3 of the object 1 and comprising as second spatial coordinate C2 a point of the known portion of the second face of the object are then defined and considered as being relevant.

The same principle can be used on the source side by selecting as relevant sources the sources optically associated with a point of a known part of the first face of the object. Optical association of a point with the spatial coordinate C1 of the first face 2 of the object with a source S is schematized in FIG. 2 by the vertical optical path of a radiation emitted by the source (for example a laser diode) and passing through the point C1. The relevant sources are thus all virtually assimilated to points situated on a known part of the second face 3 of the object.

Green's functions G(s,m) and/or G(s,d) representative of the light intensities received by the first face 2 and having as first spatial coordinate C1 a point of the known portion of the first face 2 of the object 1 are then defined and considered as being relevant.

Thus, at least one of the spatial coordinates (C1 and/or C2) of each of the Green's functions called relevant (G(s,m), G(m,d), G(s,d)) is assimilated to a point of an associated face (2 and/or 3) of the object 1. In other words, a point of a portion of known shape of the first face 2 of the object 1 is associated with the first spatial coordinate C1 of each of the corresponding relevant Green's functions G(s,m), G(s,d) and/or a point of a portion of known shape of the second face 3 of the object 1 is associated with the second spatial coordinate C2 of each of the corresponding relevant Green's functions G(m,d), G(s,d).

The signals received by detectors which are not optically associated with a point of a known portion of the surface 3 of the object and/or the signals emitted by a source which is not optically associated with a point of a known portion of the surface 2 of the object are on the other hand not taken into account for reconstruction of the image. Selection of the relevant sources and detectors therefore discards these signals, for example by setting them to zero and/or by eliminating the corresponding measurements.

The relevant Green's functions thus correspond to a source and/or a detector which is virtually assimilated to a known portion of the surface of the object and the air surrounding the object is assimilated to a highly attenuating medium, which enables any diffusion outside the object to be ignored. In this respect, reference can be made to the article "Non contact fluorescence optical tomography by means of numerical and analytical approaches", by L. HERVE et al., published on Feb. 1, 2007 in "Nuclear Instruments and Methods in Physics Research", vol. 571, p. 203-206, and presented on May 10, 2006 at the "Congres EuroMedim on 1st European Conference on Molecular Imaging Technology" and incorporated herein by reference.

Computation of the light density on output from the known portion of the surface 3 of the diffusing object from the signals detected by the detectors can then for example be performed, for a homogeneous medium, according to the above-mentioned article by J. Ripoll et al. The fluorescence of an object of any shape having a surface of partially known shape can then be reconstructed without using finite element computation to model light propagation in the object.

Figure 3:
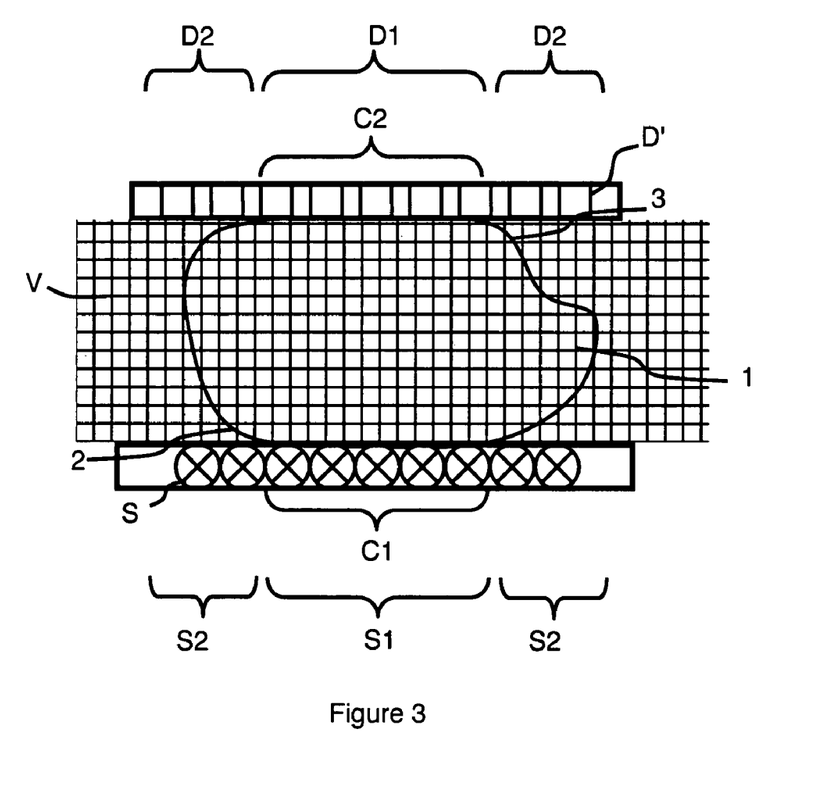
Figure 6:
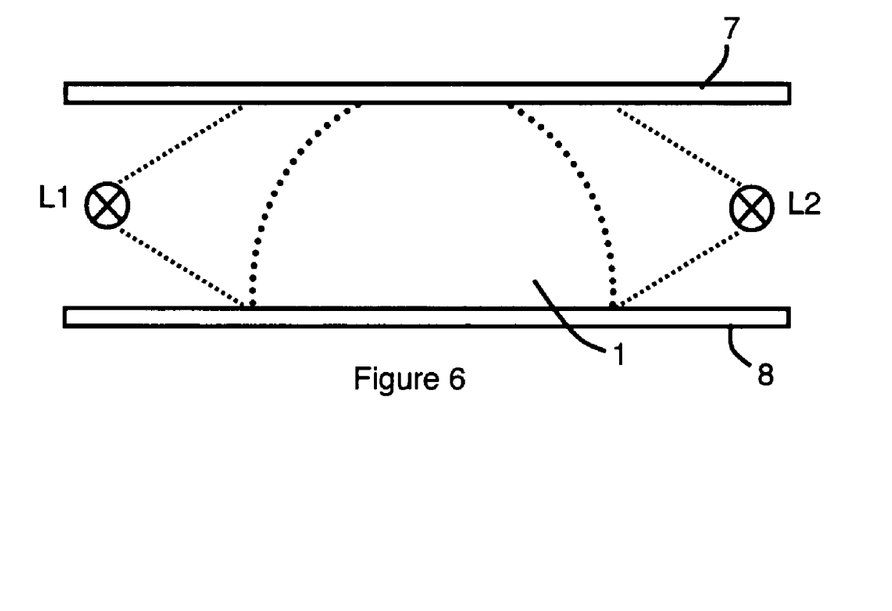

In a second embodiment, illustrated in FIGS. 3 and 6, the object is compressed between two transparent plates 7 and 8, which delineate the volume V. The volume V is larger than the object to be observed and is preferably not bounded laterally. The image D' from the detectors D is, as previously, formed close to the top face of the volume V and the sources S are considered to be located on the bottom plate. In FIG. 3, the locations of the detectors and sources are respectively considered as being formed on the top and bottom plate bounding the volume V. The object 1 is thus placed in contact with a part of the top plate associated with a group D1 of detectors. The remaining part of the top plate is on the other hand not in contact with the object 1. This remaining part is associated with a complementary group D2 of detectors formed by 2 sub-groups arranged on each side of the group D1 in FIG. 3. In like manner, a group S1 of sources or locations of sources is associated with the part of the bottom plate which is in contact with the object and a complementary group S2 of sources formed by two sub-groups located on each side of the group S1 in FIG. 3 is associated with the remaining part of the bottom plate, which is not in contact with the object.

In this embodiment, the selected sources and detectors are those which are associated with the parts of the plates in contact with the object. The corresponding relevant Green's functions therefore each have, as previously, a second spatial coordinate C2 corresponding to the second face of the object and/or a first spatial coordinate C1 corresponding to a point of the first face of the object.

The signals received by detectors corresponding to locations which are not in contact with the object and/or the signals emitted by a source which is associated with a location which is not in contact with the object are not on the other hand taken into account for reconstruction of the image. Selection of the relevant sources and detectors therefore discards these signals, for example by resetting them to zero and/or by eliminating the corresponding measurements.

Thus, in FIG. 3, the signals detected by the detectors D2 and the signals emitted by the sources S2 can be zero reset. Consequently only the signals detected by the detectors D1 and/or emitted by the sources S1, corresponding to locations in contact with the object 1, contribute to determination of the fluorophore distribution.

In the two embodiments described above, zero resetting of the signals makes it possible to use more information on the object 1 than simple elimination of the measurements, enabling a more accurate reconstruction to be obtained.

Figure 4:
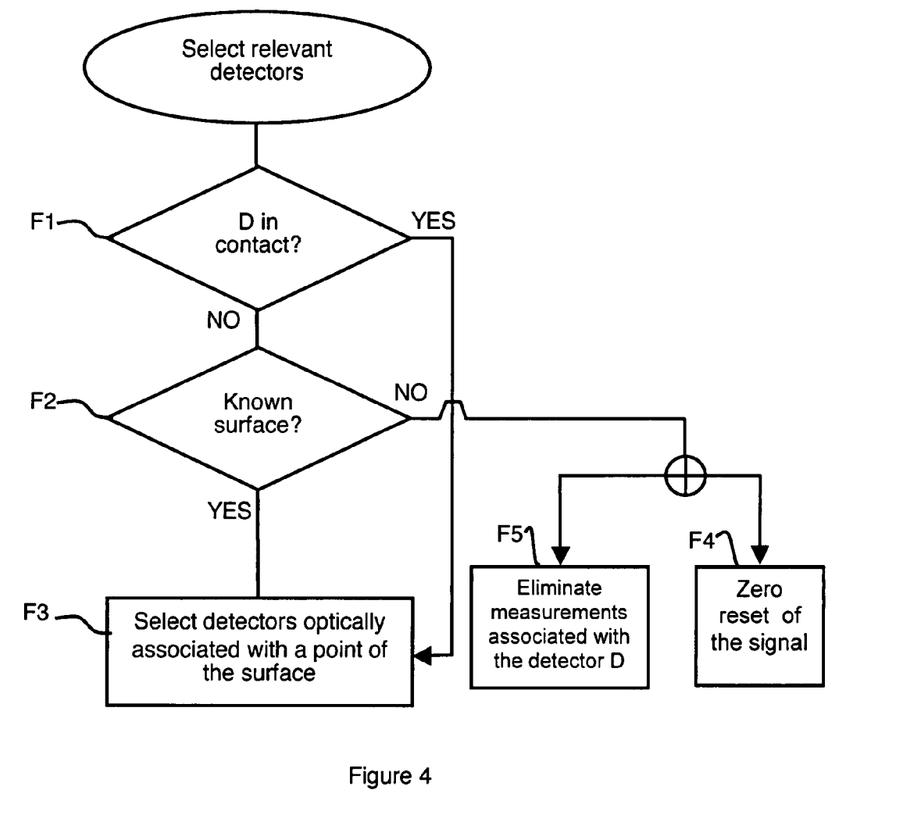
FIG. 4 schematically illustrates selection of the relevant detectors, in flowchart form, in a method according to the invention.

FIG. 4 schematically illustrates, in flowchart form, selection of the relevant detectors, i.e. the detectors optically associated with a spatial coordinate C2, by combining the two above embodiments. In a step F1, it is checked whether the detector D considered is in contact with the object 1 or not. If it is (YES output of F1), this detector D is considered as being relevant, in a step F3 (selection of the detectors optically associated with a point of the surface).

If on the other hand the detector D is not in contact with the object 1 (NO output of F1), it can nevertheless be used if it can be assimilated to a point of a known portion of the surface of the object. This condition is checked in a step F2 (Known surface?). If this is the case (YES output of F2), the detector is selected in the step F3.

If on the other hand the detector cannot be assimilated to a point of a known portion of the surface of the object (NO output of F2), either the corresponding signal is zero reset (F4), or, as an alternative (F5), the measurements and consequently the equations associated with this detector D are eliminated.

In a general manner, the invention applies on the detector side and/or on the source side. Thus, for selection of the relevant sources associated with a spatial coordinate C1, the principle illustrated in FIG. 4 applies in like manner. It then relates to the signals emitted by the sources S and checks, in a step that is analogous to F1, if there is a contact between the object 1 and each of the sources S. In an analogous step to F2, it is checked whether a source can be virtually assimilated to a known point of the surface of the object and, if this is the case, the source is selected in F3. If this is not the case, the emitted signals are zero reset in a step analogous to F4 or a step analogous to F5 consists in eliminating the measurements associated with this source S. Only the measurements associated with the group S1 of sources are therefore retained and the signals originating from the sources of the group S2 are zero reset and/or the measurements associated with the group S2 are discarded.

As indicated above, in the first embodiment, the shape of the object can be acquired, at least partially, by laser triangulation. Generally, the shape of certain zones, constituting shadow zones, sometimes can not be precisely determined. This is notably the case of verticals when the object is substantially horizontal, of zones hidden by the ears when the object is a mouse, etc. The uncertainty is moreover greater when the surface is parallel to the light rays coming from the source or in the direction of the detector. The corresponding points of the surface are discarded. In practice, at a given point of the surface of the object, the smaller the angle α (illustrated in FIG. 5) between the vertical and the perpendicular to the surface of the object, the smaller the uncertainty. For example, all the points for which this angle α is more than 45° can be eliminated. Furthermore, it is preferable not to take all the small variations of the surface of the object into account. For this, the surface considered is preferably smoothed before the corresponding angle α is determined. For example, for a mesh having a pitch of about 0.5 mm, a surface element can be smoothed over 16 points before comparing its perpendicular to the vertical or to the horizontal.

In the second embodiment, the location of the surface points of the object which are in contact with the compression plates 7 and 8 can be determined simply from measurement of the thickness of the object 1 after compression. The corresponding detectors D1 and sources S1 in contact with the object 1 can then be determined.

Figure 7:
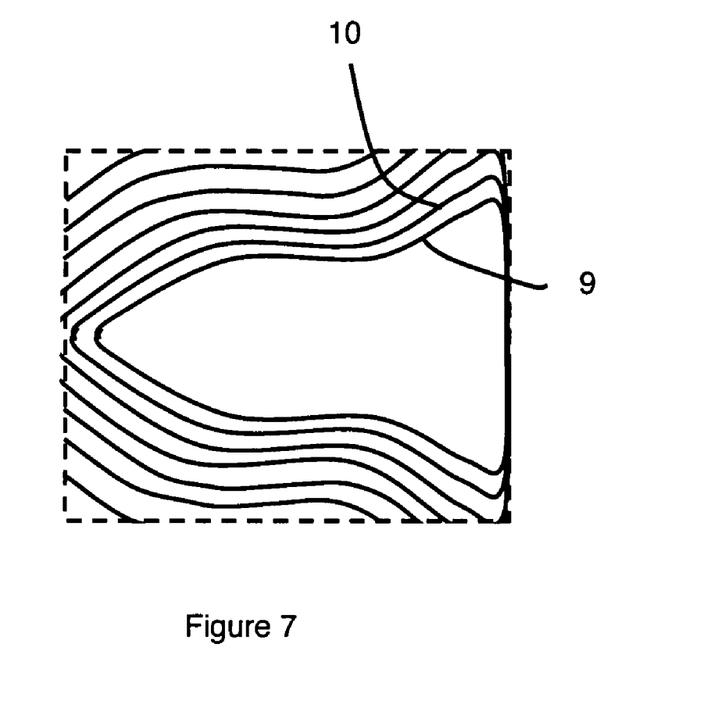

A more precise location can for example be obtained by the method described in the article "In vivo fluorescence enhanced optical tomography reconstruction of lung cancer of non immersed small animals", by L. HERVE et al., presented on Jan. 20, 2007 at the "Optical Tomography and Spectroscopy of Tissue, VII" SPIE conference in San Jose, Calif., published on Feb. 13, 2007 in Proceedings of SPIE, vol. 6434 and incorporated herein by reference. In this method, illustrated in FIGS. 6 and 7, light sources (L1 and L2), for example constituted by light-emitting diode arrays, are arranged laterally between the compression plates 7 and 8. On an image of the object illuminated in this way, the dark zones then correspond to the portions of the surface of the object which are in contact with the plates. The outline 9 of the portion in contact with each of the plates can thus be reconstituted. This outline may, as illustrated in FIG. 7, be completed by extrapolation, by curves 10, for example obtained by scale transformation. The distance separating the outline 9 and the $1^{st}$ curve 10 or two adjacent curves 10 is substantially constant, for example about one millimeter. The zone considered to be in contact with the plates can therefore be slightly enlarged thereby increasing the number of data items subsequently used to reconstitute the image of the object by fluorescence-enhanced tomography. In practice, the extrapolated zone extends barely beyond one millimeter below the top plate 7 or above the bottom plate 8.

Figure 8:
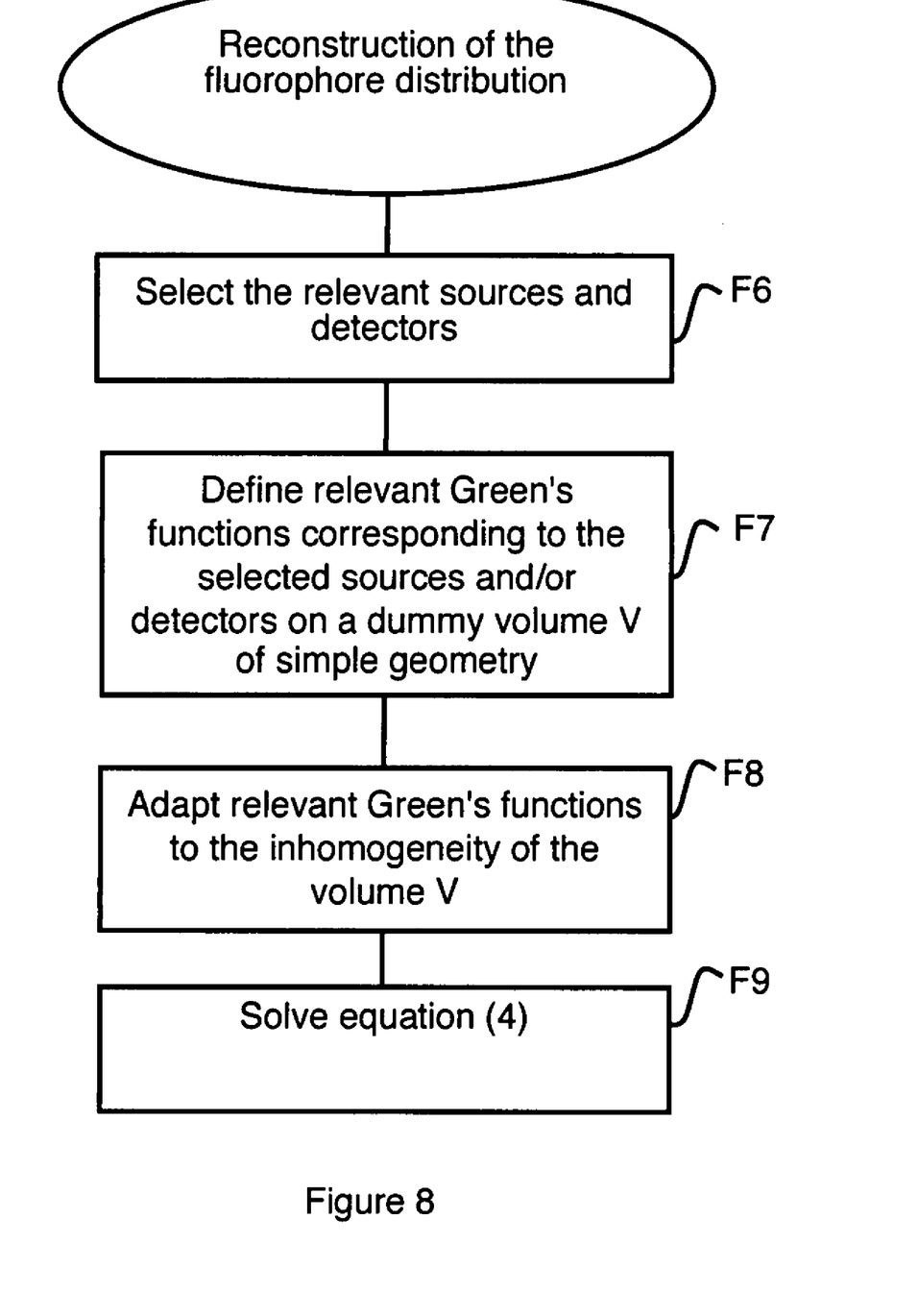
FIG. 8 illustrates a particular embodiment of reconstruction of the fluorophore distribution in a method according to the invention.

As represented in FIG. 8, the method for reconstructing the fluorophore distribution in the object 1 thus comprises first of all a step F6 of selecting the relevant sources and detectors, i.e. the sources and detectors in contact with the object or virtually assimilated to a known portion of the surface of the object, maybe with an extrapolation to enlarge the zone considered. This selection preferably uses one of the methods described above with reference to FIGS. 2 to 7.

The corresponding Green's functions, called relevant Green's functions, corresponding to the selected sources and/or detectors, are then defined in a step F7 on the dummy volume V of simple geometry. Each relevant Green's function thus comprises a first spatial coordinate corresponding to a point of a first face of the object and/or a second spatial coordinate corresponding to a point of a second face of the object, opposite the first face, each point being respectively associated with a selected source or detector. The set of relevant Green's functions $G(s,m)$, $G(m,d)$ and $G(s,d)$ therefore corresponds to the mesh of the dummy volume V, in which only the previously selected sources and detectors are kept.

The optic inhomogeneities of the whole of the dummy volume V are then taken into account in a step F8 consisting in adapting the relevant Green's functions to the heterogeneity of the whole of the volume V. These inhomogeneities are first of all constituted by the differences of optic properties between the object and the air, and possibly by the inhomogeneities internal to the object. Assimilating the measurements to the surface of the object enables the path of the optical radiation in the air to be considered to correspond to passing through a very absorbent medium, i.e. one that has an extremely high attenuation coefficient, outside the object, in the predefined dummy volume V.

The geometry of the object having been assimilated to a dummy volume V of simple geometry, any known inhomogeneity reconstruction method can be used, in particular the one described in the above-mentioned article by E. Scherleitner et al, to model the light propagation inside the volume V and adapt the relevant Green's functions to take these inhomogeneities into account.

In a preferred embodiment, reconstruction of a mapping of the inhomogeneities in the dummy volume V is performed in the manner described in International Patent Application PCT/FR2007/000693, filed on Apr. 24, 2007 and incorporated herein by reference. In this embodiment, three-dimensional spatial mapping of an attenuation variable k' is performed by solving the equation $$\nabla^2 F(\vec{r}_s, \vec{r}) - k'^2(\vec{r}) F(\vec{r}_s, \vec{r}) = A_s \delta(\vec{r} - \vec{r}_s) \quad (3)$$

in which $A_s$ is a constant, $\vec{r}$ the spatial coordinate of any point of the mesh and $\vec{r}_s$ the spatial coordinate of the light source. The transfer functions F (here the Green's functions G) of the equation used for subsequent reconstruction (step F10) of the fluorophore distribution integrate this attenuation variable k'.

Reconstruction of the inhomogeneities mapping enables account to be taken not only of the optic inhomogeneities of the object, placed in air, but also of the edge effects, in particular the reduction of the photon density in the immediate proximity of the edges.

Reconstruction of the fluorophore distribution can then be performed, in a step F9, for example by solving the equation below:

$$\phi^m(\vec{r}_s, \vec{r}_d) \propto Q(\vec{r}_s) \cdot \int_V G(k'_{ex}, \vec{r}_s, \vec{r}_f) \beta(k'_{fl}, \vec{r}_f, \vec{r}_f) \quad (4)$$

in which
the parameter $$\beta(\vec{r}_f) = \eta \cdot \delta\mu(\vec{r}_f) \quad (5)$$

conventionally depends on the quantum efficiency η of the fluorescent element constituted by a fluorophore and on the local absorption $\delta\mu(\vec{r}_f)$ due to the fluorescent elements;

the first Green's function $G(k'_{ex}, \vec{r}_s, \vec{r}_f)$ is representative of the energy transfer between the punctual excitation light source located at or assimilated to the point $r_s$ and the fluorescent element f situated at the point $r_f$;

the second Green's function $G(k'_n, \vec{r}_f, \vec{r}_d)$ is representative of the energy transfer between the fluorescent element f situated at the point $r_f$ and the detector located at or assimilated to the point $r_d$.

The measured intensity $\phi^m$ is thus proportional to the amplitude $Q(r_s)$ of the light emitted by the source S and to the integral, over the whole volume V, of the product of the first and second Green's functions and of the parameter β.

The linear equation (4) can be solved by any known linear system solving method (ART, SVD, conjugate gradients ...). This can, for example in the conjugate gradients method, be done using a convergence test tending to reduce the difference between a theoretical photon density $\phi_{th}$, determined by solving the equation (4), and a measured experimental photon density $\phi_{exp}$.

Experimental determination of the theoretical photon density $\phi_{th}$ is for example performed by illuminating the object to be observed with a continuous light, at the excitation wavelength λex, and measuring the quantity of photons received, after filtering, by the detectors at the fluorescence wavelength λfl. This determination is performed in conventional manner by processing the signals supplied by each of the detector elements for each selected source-detector pair.

Determination of the parameter $\beta(\vec{r}_f)$, performed for each location r of the mesh of the volume surrounding the object to be observed, then provides the required information as far as the location and properties of the fluorophores are concerned.

In the steps F8 and F9, which conventionally use iterative methods, limiting computations to the relevant Green's functions, i.e. those which correspond only to the selected sources and detectors, enables faster convergences to be obtained and limits the required computation time and/or power.

The invention claimed is:

1. A method for reconstructing a fluorescence-enhanced optic tomography image to examine a heterogeneous object of any shape comprising fluorophores and disposed in air, said method comprising:
    defining a dummy volume containing the object,
    selecting relevant sources and detectors, assimilated to points of the surface of the object,
    defining relevant Green's functions, in said dummy volume, each associated with a selected relevant source and/or a selected relevant detector, each relevant Green's function comprising a first spatial coordinate associated with a selected relevant source and corresponding to a point of a first face of the object, and/or a second spatial coordinate associated with a selected relevant detector and corresponding to a point of a second face of the object, opposite the first face,
    adapting the relevant Green's functions to the heterogeneity of the dummy volume,
    illuminating the first face of the object with a fluorophore excitation light from sources including the selected relevant sources,
    detecting a light emitted by the second face of the object by a matrix of detectors, the detectors including the selected relevant detectors, and
    determining the fluorophore distribution using a processor by said relevant Green's functions according to signals detected by the detectors.

2. The method according to claim 1, further comprising compression of the object between locations of the selected relevant sources and detectors, and zero resetting of the signals from the sources and/or the detectors corresponding to locations which are not in contact with the object.

3. The method according to claim 2, wherein, the object being compressed between two transparent plates, the outline of the points of the surface of the object which are in contact with the object is previously determined by lateral illumination of the object.

4. The method according to claim 1, wherein, the object being compressed, selection of the relevant sources and detectors comprises elimination of the measurements corresponding to a source and/or a detector associated with a location which is not in contact with the object.

5. The method according to claim 4, wherein, the object being compressed between two transparent plates, the outline of the points of the surface of the object which are in contact with the object is previously determined by lateral illumination of the object.

6. The method according to claim 1, further comprising experimental determination of the shape of at least a part of the surface of the object, the selected relevant sources and detectors being the sources and detectors optically associated with a point of a known part of the surface of the object.

7. The method according to claim 6, wherein selection of the relevant sources and detectors comprises elimination of the measurements associated with the sources and/or the detectors which are not optically associated with a known part of the surface of the object.

8. The method according to claim 6, wherein selection of the relevant sources and detectors comprises zero resetting of the signals from the sources and/or the detectors which are not associated with a known part of the surface of the object.

9. The method according to claim 6, wherein a point of the known surface is eliminated if the perpendicular to the surface at this point forms an angle with the vertical that is larger than a predetermined threshold.

10. The method according to claim 1, wherein adaptation of the relevant Green's functions to the inhomogeneities of the dummy volume comprises reconstruction of the three-dimensional spatial mapping of an attenuation variable representative of the diffusion and absorption inhomogeneities.

* * * * *